July 16, 1963   R. A. JAMES ET AL   3,097,942
PROCESS FOR DRAWING GLASS SHEET
Filed Nov. 3, 1958   8 Sheets-Sheet 1

FIG. 1

PRINCIPAL AIR CURRENTS IN DRAWING KILN OF PRIOR ART CONSTRUCTION

INVENTORS
ROBERT A. JAMES and
CECIL R. WARD
BY
Oscar L. Spencer
ATTORNEY

FIG. 3

July 16, 1963 R. A. JAMES ETAL 3,097,942
PROCESS FOR DRAWING GLASS SHEET
Filed Nov. 3, 1958 8 Sheets-Sheet 4

FIG. 4

INVENTORS
ROBERT A. JAMES and
CECIL R. WARD
BY
Oscar L. Spencer
ATTORNEY

FIG. 6

United States Patent Office 3,097,942
Patented July 16, 1963

---

3,097,942
PROCESS FOR DRAWING GLASS SHEET
Robert A. James, Decatur, Ill., and Cecil R. Ward, Cheswick, Pa., assignors to Pittsburgh Plate Glass Company, Allegheny County, Pa., a corporation of Pennsylvania
Filed Nov. 3, 1958, Ser. No. 771,393
4 Claims. (Cl. 65—85)

This invention relates to the manufacture of sheet glass by continuous drawing from a bath of molten glass and provides improved methods and apparatus for producing drawn sheet glass of improved appearance wherein the usual characteristic wave pattern, i.e., transverse thickness variations which appear as bands or ribs, extending generally in the direction of the draw, is eliminated or materially reduced.

These characteristic wave patterns primarily occur because of non-uniform cooling of the sheet across its width. To provide uniform cooling of the sheet, it is desirable to allow the heat loss to take place substantially entirely by radiation rather than by a transfer to convection currents or a combination of radiation and a transfer to convection currents.

In conventional processes of drawing sheet glass, a natural stack is induced by the geometry of the sheet, bath and drawing chamber wherein their is a transfer of heat from the bath and sheet at relatively elevated temperatures to the cooler ambient air within the chamber producing a convection flow of air in the direction of the draw and out of the chamber. The movement of the heated air in the direction of the draw results in zones of reduced pressure at the base or meniscus of the sheet, so that colder air is drawn to the reduced pressure zones. Air enters the drawing chamber at the juncture of the chamber and the drawing machine and leaks into the chamber from cracks, crevises, or the like in the chamber walls. Colder air flowing to the zones of low pressure is chilled by moving generally across coolers, which are disposed within the chamber slightly above the surface of the bath and on the opposite sides of the sheet to accelerate the setting of the glass. As readily understood, the temperature of entering air will be non-uniform because of differences in temperature of the sources of this air and this condition will persist due to differences in paths taken by this air in the drawing chamber and, also, due to conditions within the kiln. These temperature differences cause non-uniform velocities within the drawing chamber. The colder air of non-uniform velocities flows to the reduced pressure zones and disturbs the relatively thin surface adhering film moving with the glass causing non-uniform heat transfer across the sheet, thereby affecting the formation of the glass in the area where the glass undergoes the transition from fluid to solid state. Being in the plastic state and under stress, the glass is unequally attenuated to form a characteristic longitudinal wave pattern.

Another characteristic wave pattern extends diagonally and usually exists on the outer margins of the sheet. This diagonal wave pattern may be so severe, in some instances, as to extend entirely across the sheet. The diagonal wave pattern, when superimposed on a longitudinal wave pattern provides a pattern referred to in the sheet glass industry as "batter" or "dapple," and is the result of currents of colder air flowing from the vicinity of the ends of the coolers and the ends of the drawing chamber to the zones of low pressure at the base of the sheet. These currents of air are commonly referred to as "end-around currents."

Many arrangements have been proposed to improve the apppearance of drawn sheet glass. One such arrangement is taught by Brichard in United States Patent No. 2,693,052 wherein burners or suction means are disposed just above the surface of the bath to eliminate flow of relatively cold air to the base of the glass sheet and to eliminate flow of air along the sheet in the direction of the draw. Thus, either no air flow takes place along the sheet or else such air flow as takes place moves along the sheet in a direction opposite to that of the draw.

It has been found that the appearance of drawn sheet glass may be materially improved if, instead of eliminating the flow of air to the base of the sheet, the flow of air to and from the base of the sheet is controlled or regulated, so as to be diminished but not eliminated. This control or regulation of the flow of air to the base of the sheet does not eliminate but reduces the flow of air along the sheet in the direction of the draw. The latter flow of air forms an undisrupted uni-directional protective layer or envelope surrounding the sheet and moving at a velocity sufficiently low so that it does not disturb the relatively thin insulating surface adhering film of air surrounding the sheet. This reduction of flow of air to and from the base of the sheet eliminates or materially reduces the non-uniform disturbance of the relatively thin surface adhering film of air surrounding the sheet, so that variations in attenuation of the sheet are materially reduced, thus providing an improvement in the appearance of the sheet.

The provision of a protective envelope of air moving at a sufficiently low velocity in the direction of the draw results in a minimized cooling of the glass sheet by heat transfer through convection currents and thereby allows more uniform cooling of the sheet by radiation to the usual coolers spaced from the sheet and located slightly above the surface of the bath of molten glass. The end-around currents are also reduced and/or rendered ineffective, so that the usual diagonal wave pattern is eliminated. Thus, methods and apparatus have been devised for eliminating the undesirable effects of air currents which naturally occur in a sheet glass drawing device while retaining their desirable effects. Stated somewhat differently, methods and apparatus have been devised for reducing the flow of air to and from the base of a glass sheet being drawn to such a degree as to minimize undesirable effects, while yet retaining sufficient flow of air so as to form a protective envelope surrounding the sheet in the direction of the draw and obtain new desirable effects.

Briefly, the invention herein disclosed includes the use of means that serve as barriers, diverters, or isolators, or various combinations of these means so located and positioned within a drawing chamber or supported adjacent to components defining the chamber as to reduce the flow, i.e., quantity and velocity, of air to and from the base of a glass sheet as it is being drawn and to control the flow of air along the sheet to minimize non-uniformities in heat transfer from the sheet along its path of movement in the kiln. This reduction diminishes the undesirable effects which naturally occur in the chamber because of air currents therein while retaining the desirable effects of the naturally occurring air currents in the form of a protective envelope of air of diminished velocity surrounding the sheet moving in the direction of the draw.

Therefore, the primary object of this invention is the provision of improved methods and apparatus for improving the appearance of drawn sheet glass.

Another object of this invention is the provision of methods and apparatus employing means which serve as barriers, diverters or isolators for reducing the flow of air to and from the base or meniscus of a sheet of glass as it is being drawn from a bath of molten glass in a drawing chamber with the resultant elimination or material reduction in the usual characteristic wave pattern of the sheet 10 which extends generally in the direction of the draw.

A still further object of this invention is the provision of methods and apparatus for eliminating the undesirable effects which occur in a sheet glass drawing chamber because of the natural air currents while retaining the desirable effects of these air currents, thereby materially improving the appearance of the sheet glass being drawn.

Other objects and features of this invention will be apparent from the following description and the appended drawings, which illustrate various embodiments of the invention and in which.

Turning to the drawings wherein like parts are identified with like reference characters, there is shown in each figure a sheet of glass 10 being drawn from a bath 12 of molten glass in a drawing kiln generally indicated at 13 (only parts of which are shown but which is a conventional construction). A draw bar 14 extending transversely of the kiln 13 is submerged in bath 12. The glass sheet 10 in its viscous condition forms a base or meniscus 16 with the surface of the bath 12, and the sheet 10 is drawn from the bath 12 and through the drawing chamber 22 of a kiln 13 by means of drawing rolls 18 of a conventional drawing machine generally indicated at 20. The drawing chamber 22, as depicted in the drawings, is defined by bath 12 and conventional L-blocks 24, ventilator water coolers 26, end walls 28 and catch pans 30. The ventilator coolers 26 are each positioned between an L-block 24 and the base framework of the drawing machine 20 and extend substantially to the end walls 28 of the kiln 13. The base of the drawing machine 20 is substantially closed by means of the generally U-shaped catch pans 30, which are formed as coolers and are positioned so as to catch broken glass which may drop in the machine and thus prevent entry of fragments into the bath 12. These catch pans 30 also extend substantially to the end walls 28 of the kiln 13 and are constructed for the passage of cooling fluid, such as water. One leg of each catch pan 30 is disposed substantially parallel to and spaced from the sheet 10. Conventional water coolers 32 are provided for cooling sheet 10 by absorbing radiation from the sheet 10. The coolers 32 are spaced above the surface of the bath 12 and are positioned on opposite sides of the sheet 10 to extend substantially the width of the sheet.

So much of the apparatus as has been just described is common to the prior art and the instant invention and constitutes a normal or usual sheet glass drawing apparatus setup.

Figure 2:
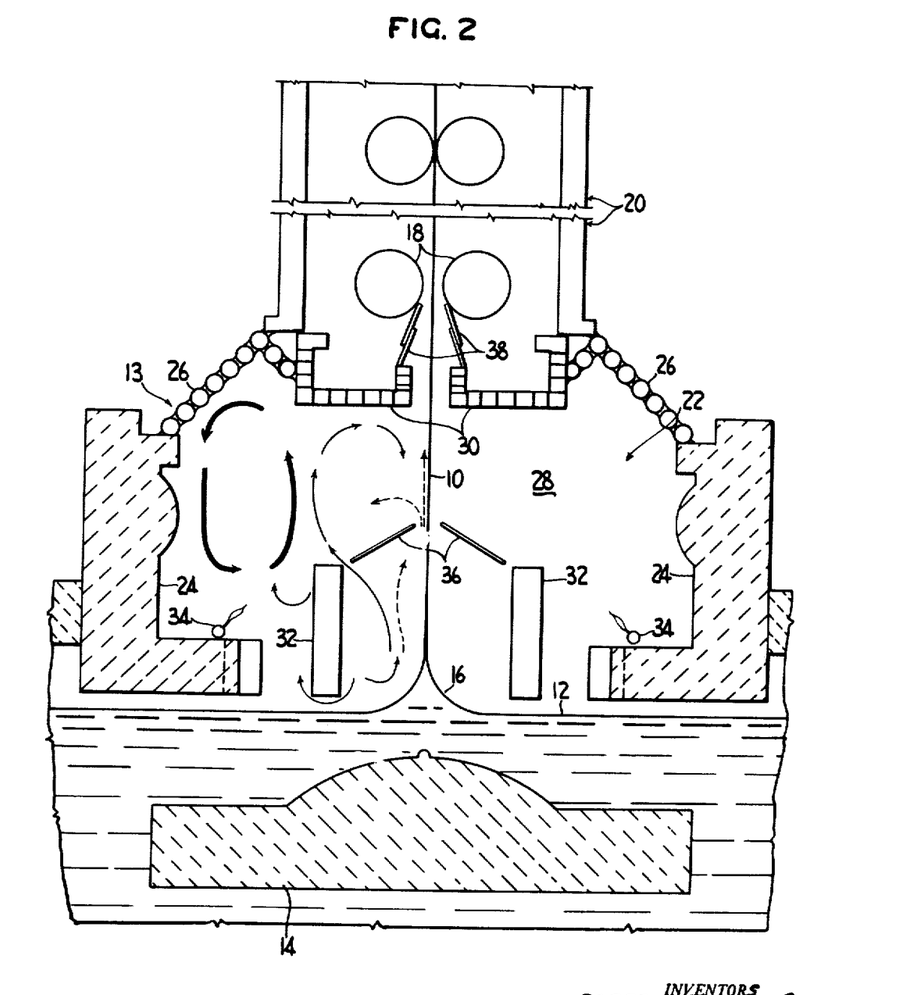
FIG. 2 shows diagrammatically the preferred embodiment of a drawing kiln according to this invention and the flow of principal air currents therein.

Reference is now made to FIG. 2 illustrating the preferred embodiment of this invention wherein, in addition to the conventional apparatus elements in their usual structural arrangement, there are burners 34, and also preferably solid heat resistant plates 36 positioned between and spaced from the coolers 32 and sheet 10, and adjustable dampers 38 on each side of sheet 10 and disposed between the catch pans 30 and the first pair of rolls 18 of the drawing machine 20. Dampers 38 extend substantially the width of drawing machine 20. Each of these burners and plates extends transversely of the chamber 22 for at least the width of the sheet 10 and, as will be explained, all of the devices affect the normal air currents within the chamber 22.

Figure 8:
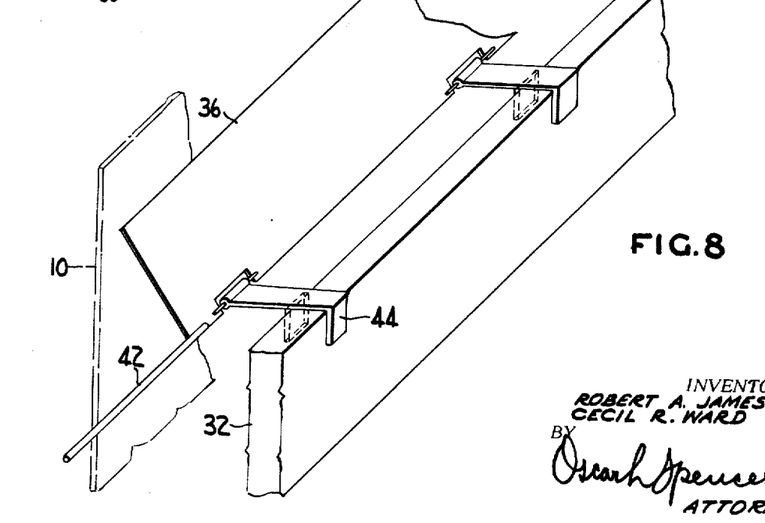
FIG. 8 is a partial, isometric view of the construction of an adjustable plate employed in the embodiments illustrated in FIGS. 2 and 5, showing its connection to a cooler.
Figure 9:
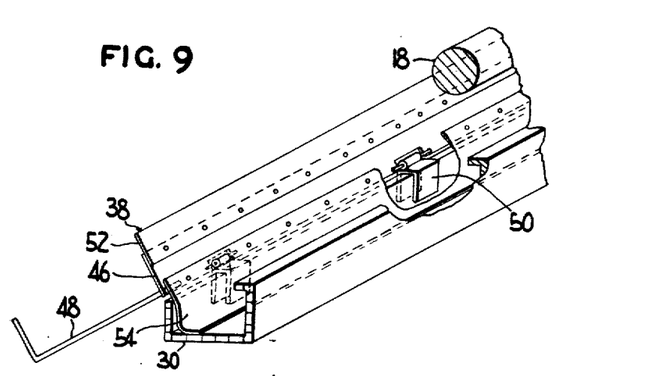
FIG. 9 is a partial, isometric view of an arrangement of adjustable dampers usable with the embodiments illustrated in FIGS. 2 to 5, showing connections to a catch pan and relationship to a roll of a drawing machine.

The burners 34 are pipes, each having closely spaced holes through which combustible fluid can escape, preferably normal to the longitudinal axis of pipe 34. Upon combustion the gaseous products form a substantially continuous sheet of heated gases extending across the chamber 22. The burners 34 are illustrated as having their flames directed upwardly at an inclined angle toward sheet 10. The burners 34 are so constructed as to be rotatable to vary the inclined angle of the flames. The plates 36 are constructed for rotation about the edge adjacent the coolers 32 and are illustrated as being inclined upwardly from the top of the coolers 32 toward sheet 10. The dampers 38 are constructed so as to be adjustable to vary their angular disposition and their upward disposition and by adjustment can be spaced from or wipe against the rolls 18. Structural details of typical plates and dampers are illustrated in FIGS. 8 and 9, respectively, and will be later described.

Figure 3:
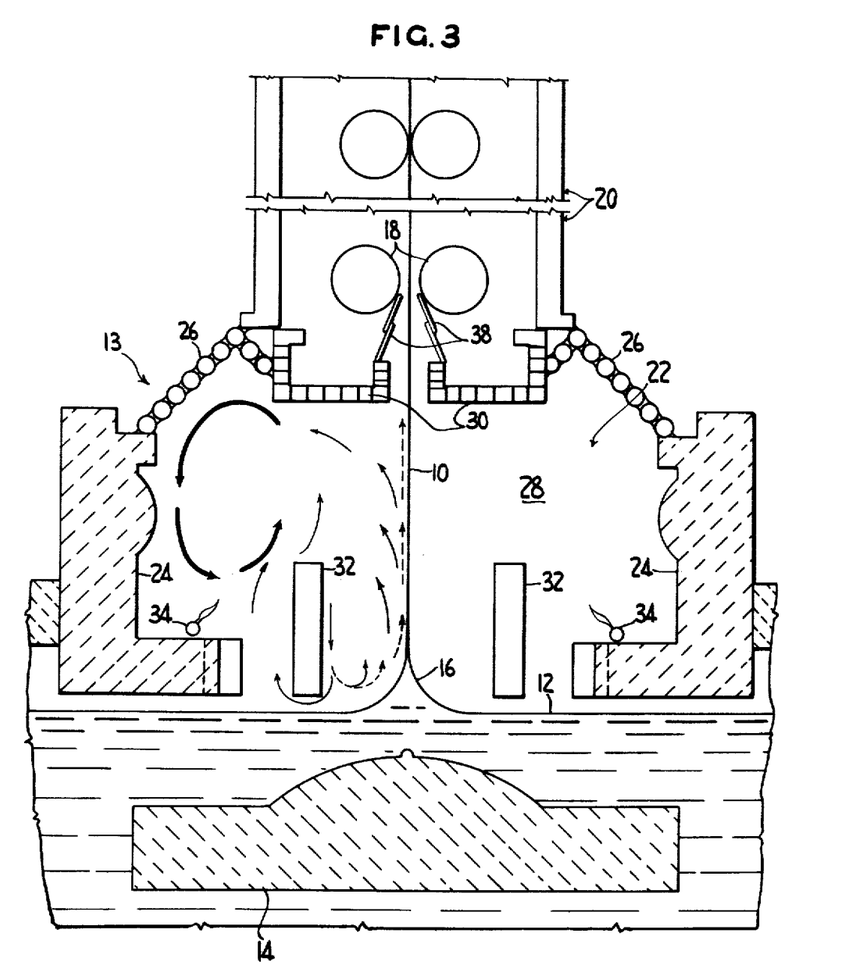
FIG. 3 shows diagrammatically a second embodiment of this invention and the flow of principal air currents therein.

FIG. 3 illustrates a second embodiment of the invention wherein the arrangement is similar to that illustrated in FIG. 2, except plates 36 are not employed.

Figure 4:
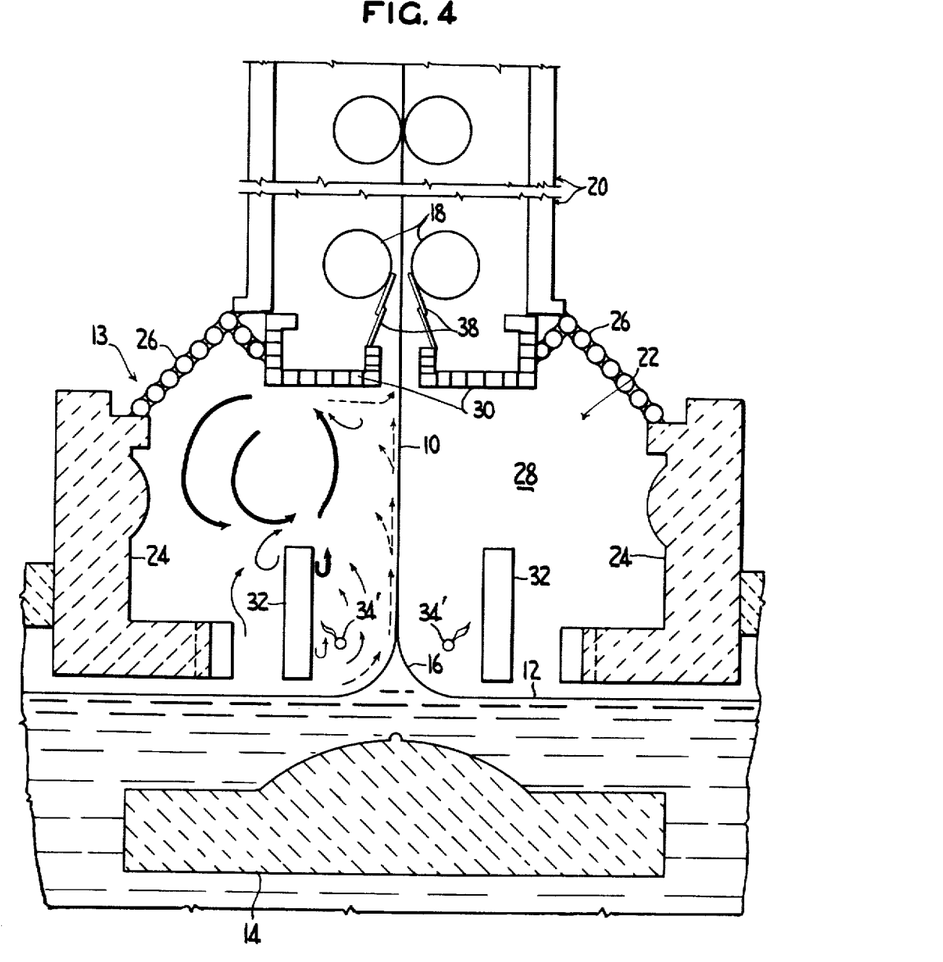
FIG. 4 shows diagrammatically a third embodiment of this invention and the flow of principal air currents therein.

FIG. 4 illustrates a third embodiment of the invention. The construction is identical to that of FIG. 2 except that plates 36 are absent and the burners corresponding to element 34 of FIG. 2 are repositioned and designated as burners 34'. Burners 34' are located between coolers 32 and sheet 10. Burners 34' extend substantially the width of the sheet with their flames directed upwardly and generally toward coolers 32 and away from sheet 10.

Figure 5:
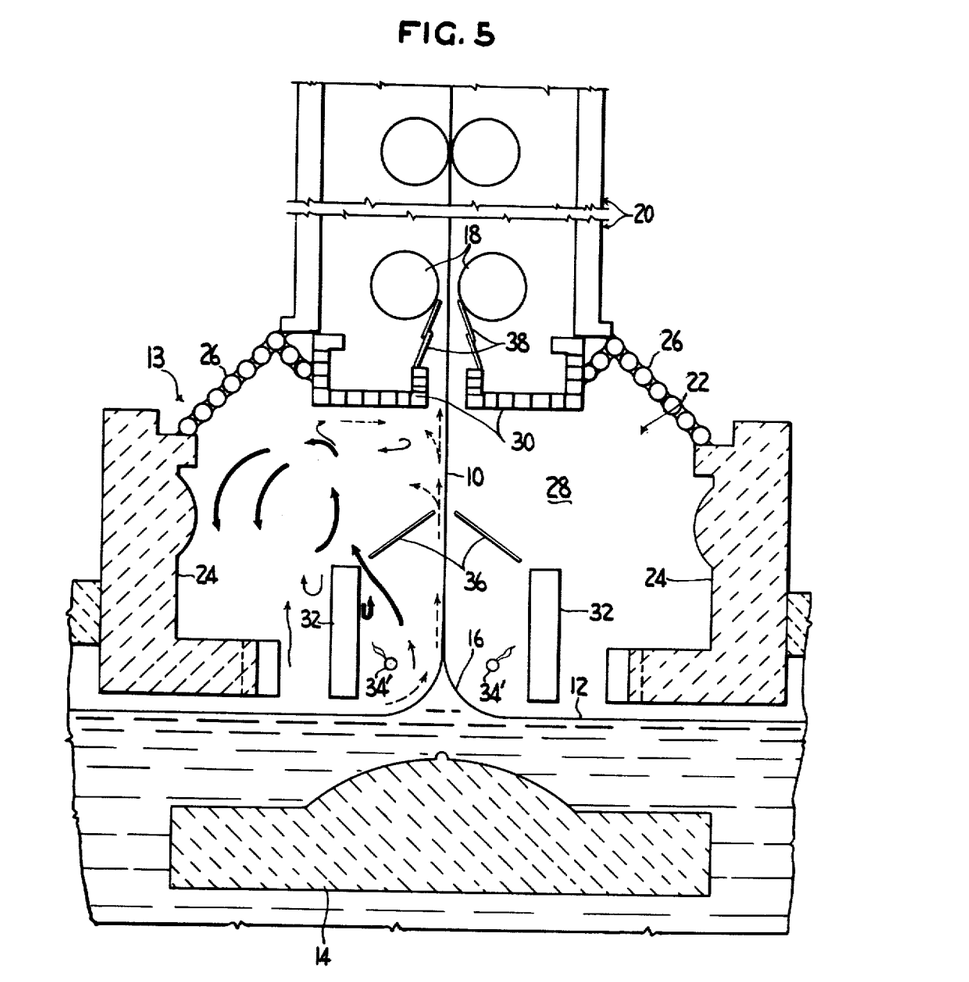
FIG. 5 shows diagrammatically a fourth embodiment of this invention and the flow of principal air currents therein.

FIG. 5 illustrates a fourth embodiment of the invention wherein the arrangement is similar to that illustrated in FIG. 4, but with the addition of plates 36 positioned between and spaced from the coolers 32 and sheet 10 as in the embodiment of FIG. 2.

Figure 6:
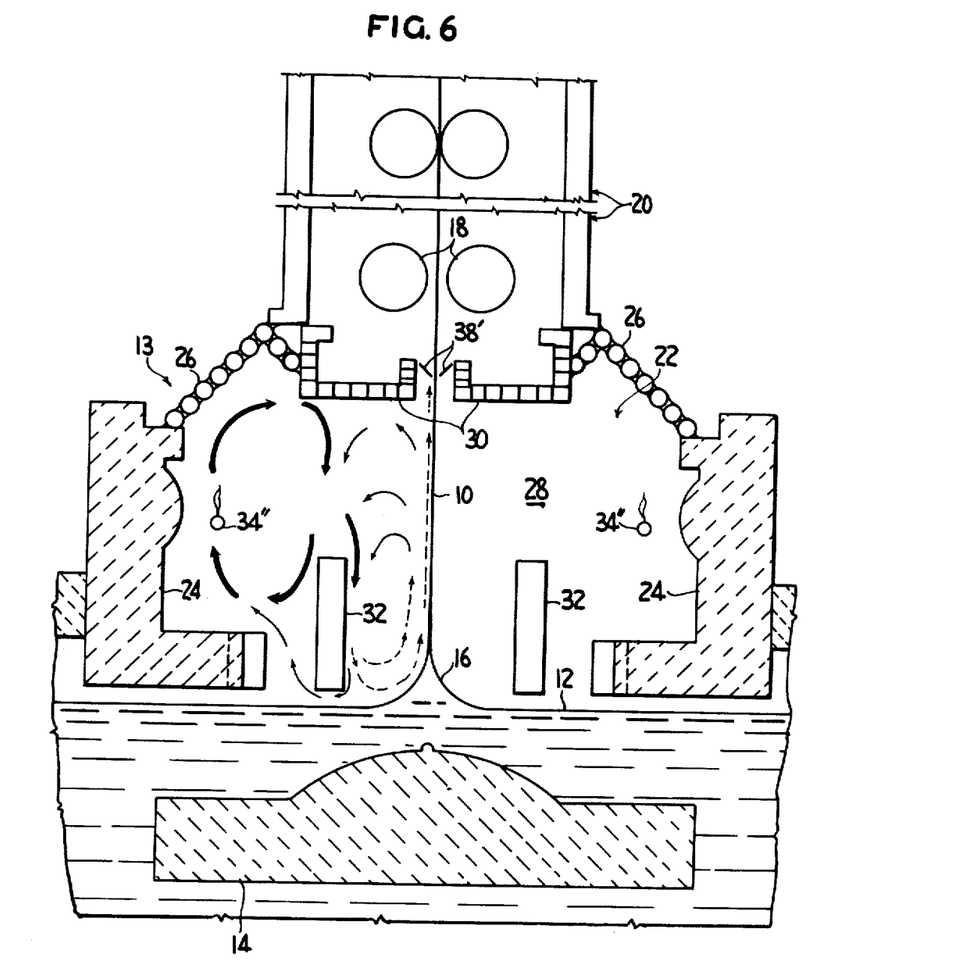
FIG. 6 shows diagrammatically a fifth embodiment of this invention and the flow of principal air currents therein.
Figure 10:
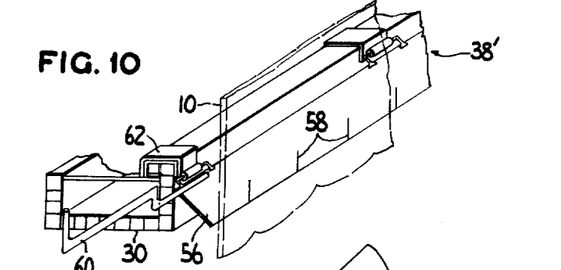
FIG. 10 is a partial isometric view of an arrangement of a second embodiment of adjustable dampers showing connections to a catch pan and relationship to a sheet of glass being drawn.

FIG. 6 illustrates a fifth embodiment of the invention wherein the construction is similar to that illustrated in FIGS. 3 and 4, except that the burners corresponding to element 34 of FIG. 3 or the burners corresponding to element 34' of FIG. 4 are repositioned and designated as burners 34'', and the dampers corresponding to element 38 are replaced with dampers constructed as shown in FIG. 10 and designated as dampers 38'. Burners 34'' extend substantially the width of sheet 10 and are located approximately midway of the height of L-blocks 24 with their flames directed vertically or at a slight angle from the vertical. Dampers 38' are positioned between each catch pan 30 and sheet 10, extend substantially the width of machine 20, and are directed downwardly from catch pans 30 toward sheet 10. Dampers 38' do not, of course, contact the surfaces of sheet 10.

Figure 7:
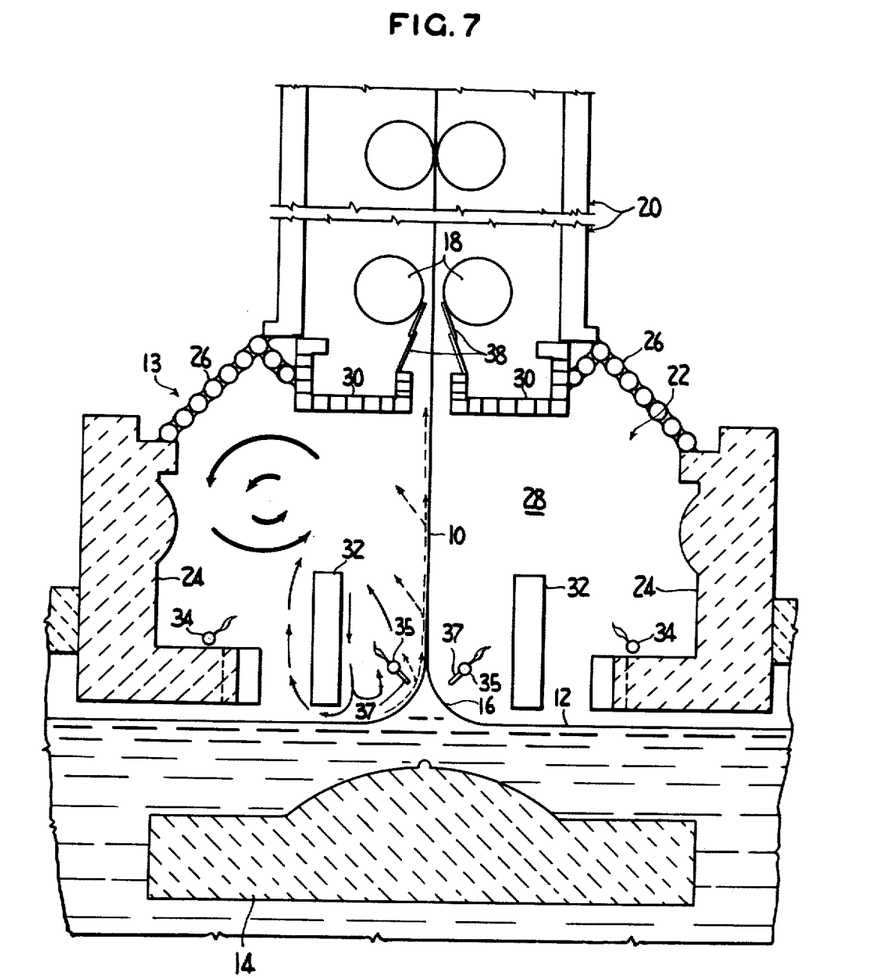
FIG. 7 shows diagrammatically a sixth embodiment of this invention and the flow of principal air currents therein.

FIG. 7 illustrates a sixth embodiment of the invention wherein the construction is similar to that illustrated in FIG. 3 with the addition of baffle-burners 35, one on each side of sheet 10 and located between sheet 10 and coolers 32 with their flames angled upwardly toward coolers 32 away from sheet 10. Burners 35, like burners 34 are constructed of pipes having closely spaced holes through which combustible fluid can escape and extend substantially the width of sheet 10. Attached to the pipes are baffle plates 37 constructed of heat resistant material, such as solid plates of a steel alloy, screens of a steel alloy, or plates of a ceramic material. Baffle plates 37 are substantially diametrically aligned with the closely spaced holes for the escape of the combustible.

FIG. 8 illustrates constructional details of an adjustable plate 36 which, as shown and explained with reference to FIGS. 2 and 5, is positioned transversely in a drawing chamber between and spaced from a cooler 32 and sheet 10. Details of the drawing chamber are omitted for sake of clarity. Plate 36 is, as previously stated, preferably constructed of solid heat resistant material, such as a steel alloy. A rod, arm or handle 42 is connected, as by welding, to one end of plate 36 and extends through a suitable opening (not shown) in an end wall 28 of chamber 22. Plate 36 is hinged to a plurality of F-shaped brackets 44 which fit over cooler 32, as illustrated, to position plate 36 in chamber 22. Rotation of rod or arm 42 causes rotation of plate 36 to vary the angle of plate 36 and the spacing of its leading edge, i.e., the edge adjacent sheet 10, with sheet 10. The spacing of the trailing edge from cooler 32 is fixed by brackets 44.

FIG. 9 illustrates constructional details of an adjustable damper 38 which, as shown and explained with reference to FIGS. 2 to 5, is positioned transversely in a drawing kiln between a catch pan 30 and a first roll 18 of drawing machine 20, so as to constrict the opening in the drawing chamber at the juncture of the drawing machine. Details of the drawing kiln and drawing machine are omitted for sake of clarity. Damper 38 includes a heat resistant plate 46, constructed of a material such as a steel alloy. A rod, arm or handle 48 is connected, as by welding, to one end of plate 46 and extends through a suitable opening (not shown) in an end wall 28. Plate 46 is hinged to a plurality of U-shaped brackets 50 which fit over portions of catch pan 30, as illustrated, to position plate 46 in its desired location. A strip 52, preferably of asbestos or the like is connected, as by riveting, to plate 46 for its entire length. A second, but curved, strip 54, preferably of asbestos is also connected, as by riveting, to plate 46 to seal any space between catch pan 30 and plate 46. One edge of strip 54 abuts catch pan 30, as illustrated. Rotation of rod or arm 48 rotates plate 46 and connected strip 52 to vary the spacing of damper 38 from roll 18. The length of plate 46 and strip 52 is sufficient, when damper 38 is so positioned, to wipe against the surface of roll 18.

FIG. 10 illustrates constructional details of adjustable damper 38' which, as stated referring to FIG. 6, is positioned transversely in a drawing kiln between a catch pan 30 and glass sheet 10. Dampers 38' also constrict the opening in the drawing chamber adjacent the juncture of the drawing machine. Dampers 38' are angled downwardly from catch pan 30 toward sheet 10. Details of the drawing kiln and machine are again omitted for clarity. Damper 38' includes a heat resistant plate 56 constructed of a material such as a steel alloy and, as illustrated, may have a plurality of slits 58 in the leading edge (adjacent sheet 10). Slits 58 maintain plate 56 substantially free of warp due to high temperatures. A rod, arm or handle 60 is connected, as by welding, to one end of plate 56 and extends through a suitable opening (not shown) in an end wall 28. Plate 56 is hinged to a plurality of U-shaped brackets 62 which fit over portions of catch pans 30 to thereby place damper 38' in its desired location. Rotation of rod or arm 60 rotates plate 56 about the hinges to vary the spacing of damper 38' from sheet 10.

In the constructions illustrated in FIGS. 8, 9 and 10, suitable means are provided for retaining the devices in their adjusted positions. Also, each part of each device is individually adjustable for optimum results. One such means could take the form of a collar and suitable detents cooperating with the arm, rods, or handles 42 and 48, such means being located outside the chamber 22.

In FIGS. 1 to 7, inclusive, of the drawings, the directions of the principal air currents within the drawing chamber 22 are shown by arrows for the left-hand portion of chamber 22. It is not necessary to show the principal air currents to the right of sheet 10 because they are mirror images of those shown. Relatively high, intermediate, and relatively low velocity air currents are shown in heavy solid, light solid, and broken lines, respectively.

Figure 1:
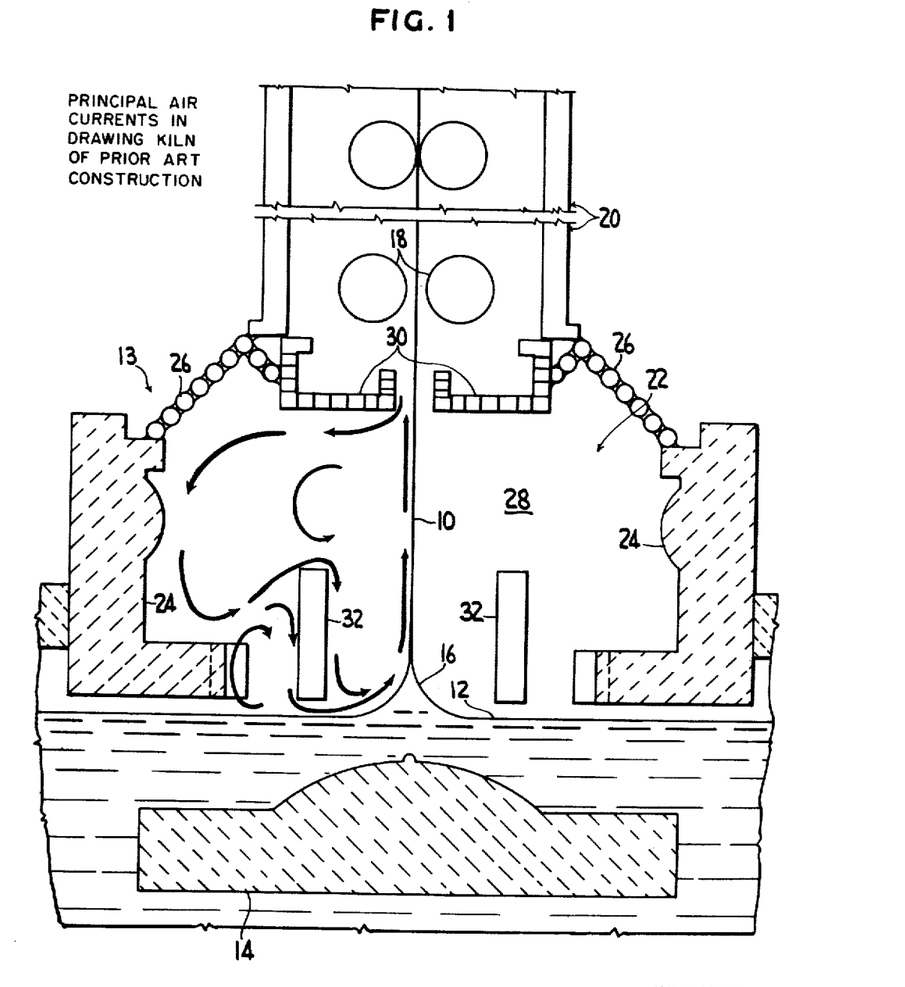
FIG. 1 shows diagrammatically a drawing kiln of a conventional, prior art construction and the flow of principal air currents therein.

In FIG. 1 the principal air currents for the normal drawing kiln arrangement are illustrated.

The temperature of glass sheet 10 in its travel through chamber 22 is substantially above the general air temperature within chamber 22, so that sheet 10 induces air to flow in the direction of its draw and along its faces. This air flow creates low pressure zones in the vicinity of each side of the base 16 of sheet 10. The currents of air along the faces of the sheet are those which form the natural stack effect. This layer of air along the sheet moves at a substantially greater velocity than the sheet. To supply this stack flow of air there must be a supply of air flowing to the low pressure zones. A primary source of this air is the drawing machine. That air enters chamber 22 between sheet 10 and catch pans 30 at a temperature below that of sheet 10 and flows past the catch pans 30, which are constructed as coolers, the ventilator coolers 26 and the L-blocks 24 between the end walls 28, all at a relatively low temperature, so that a zone on each side of sheet 10 and generally bounded by catch pan cooler 30, ventilator cooler 26, L-block 24 and walls 28 becomes a secondary source of colder air. The temperature in this secondary zone will vary transversely thereof, being lower adjacent the end walls 28, so that air in different portions in this zone will also vary in temperature. Air from this zone flows to the low pressure zone at the base 16 on each side of sheet 10. The colder air from the secondary source flows downwardly and across the faces of coolers 32, being further chilled, and into the low pressure zone at the base of sheet 10, thereby providing a relatively large quantity of colder air and, more importantly, moving at relatively high velocities of different magnitudes to the low pressure zone. This colder air of different temperatures and velocities transversely of chamber 22 disturbs non-uniformly the air traveling with the sheet, resulting in the formation of the usual characteristic longitudinal wave pattern extending in the direction of the draw. End-around currents of colder air also flow to the low pressure zones at the base 16 of sheet 10 and disturb the air flowing with the sheet in the direction of the draw, thus resulting in the diagonal wave pattern.

As previously mentioned, the invention contemplates the use of means which act as barriers, diverters, and isolators or various combinations of these so located and positioned in the chamber of a drawing kiln to reduce the flow, i.e. quantity and velocity, of air to the base of a glass sheet as it is being drawn, thereby eliminating or materially reducing the intensity of the usual characteristic wave pattern.

Before discussing the various air currents in the arrangements depicted in FIGS. 2 to 7, inclusive, the expressions "barriers," "diverters," and "isolators" require explanation. A barrier is a physical obstruction placed in a flow stream thereby reducing its velocity. A diverter is a device which changes the direction of flow of a fluid. An isolator is that which reduces or eliminates the quantity of fluid flowing into and/or out of a zone.

In accordance with this invention, various devices have been developed for use with a sheet glass drawing apparatus which perform all the functions described in varying degrees, but which have been developed and so positioned to primarily perform one of the functions described.

Looking now at FIG. 2, the arrangement including the burners 34, the plates 36 and the dampers 38, we note that the entry of air from a primary source, i.e., the drawing machine 20, is effectively prevented or materially reduced by dampers 38, so that the quantity of relatively colder air moving to chamber 22 is materially reduced. The quantity of relatively colder air moving to chamber 22 being materially reduced, it follows that the quantity of air moving out of chamber 22 will also be materially reduced. Thus, the velocity of air moving out of chamber 22 is lowered—the desired effect, as will be explained.

The burners 34 shown as having their flames angularly directed away from the L-blocks 24 alter or divert the path of movement of air in the zone of the secondary source of air, giving a cyclic path to this air. The burners 34 also create zones of low pressure adjacent their locations, so that air from the vicinity of the coolers 32 is diverted into the cyclic path of the air in the zone of the secondary source. Thus, the direction of flow across the coolers 32 is altered. This altering and diversion of air by burners 34 reduces the quantity of air flowing to the base of the sheet 10. As a result the velocity of the layer of air moving in the direction of the draw from the base 16 of the sheet 10 is lessened.

Plates 36 reduce the quantity of air flowing out of the low pressure zones at the base of the sheet, i.e., in the direction of the draw, and thus serve to further reduce the velocity of this air flowing in the direction of the draw. Because of this reduction in the quantity of air flowing from the zones at the base of the sheet, the quantity of air flowing into these zones is also further reduced. There is the desired reduced flow of air in the direction of the draw in the spaces between plates 36 and sheet 10—the previously referred to protective envelope. This air, reduced in velocity and diminished in quantity, the effects of its non-uniformity in velocities and temperatures are diminished, so that the usual disturbance of the relatively thin surface adhering film of air adjacent the sheet does not occur. As a result there is elimination of material reduction in the intensity of the wave pattern of the sheet.

The plates 36, because of the spaces between them and coolers 32, also provide an auxiliary stack effect whereby air between coolers 32 and the established protective envelope moving in the direction of the draw is diverted and is carried into cyclic paths in the zone of the secondary source. The end-around currents are pulled into this stack, so as to be rendered ineffective to cause a diagonal wave pattern on the sheet.

The auxiliary stack effect inhibits the occurrence of undesirable cyclic currents of air in the low pressure zone adjacent the base 16 of the sheet 10.

Thus, the invention utilizes in this embodiment a combination of catch pan dampers 38, primarily serving as barriers; burners 34, primarily serving as diverters; and plates 36, primarily serving as isolators. Each of the devices provide the other functions to a lesser degree, for example, in reducing the quantity of air flowing into and out of chamber 22, catch pan dampers 38 secondarily function as isolators; in reducing or eliminating the flow of air to coolers 32 burners 34 function secondarily as isolators and in creating new currents counter to normal currents, velocity is changed from plus to minus, so that burners 34 also function secondarily as barriers; and in diverting currents into the secondary stack, plates 36 function secondarily as diverters.

Turning to FIG. 3 showing the arrangement which includes burners 34 and dampers 38, the entry of air from a primary source, i.e., the drawing machine 20, is effectively prevented or materially reduced by dampers 38 so that the quantity of colder air entering chamber 22 is materially reduced. Thus, the quantity and primarily the velocity of air flowing out of chamber 22 are reduced. Burners 34 create zones of low pressure, so that air from the vicinity of coolers 32 moves into the cyclic path of movement of the air within the zone of the secondary source rather than to base 16 of sheet 10. For both reasons, the quantity and velocity of air flowing to base 16 of sheet 10 is reduced. The air flowing toward base 16 of sheet 10 being materially reduced in velocity and in quantity, the effects of its non-uniformity in velocities and temperatures does not disturb the relatively thin surface adhering film of air adjacent the sheet. Because this flow of air to base 16 of sheet 10 is not entirely eliminated, air still flows in the direction of the draw as the protective envelope. Some of this air is diverted into the cyclic path of movement of the air in the zone of the secondary source and is rendered ineffective to disturb the film of air adjacent the sheet 10.

As far as the end-around currents are concerned, these are drawn into the cyclic path of movement of the air in the zone of the secondary source and are rendered substantially ineffective to disturb the relatively thin surface adhering film of air adjacent the sheet. The overall effect is the material reduction or elimination in intensity of the usual wave patterns.

Thus, the invention utilizes in this embodiment a combination of catch pan dampers 38, primarily serving as barriers, and burners 34, primarily serving as diverters. Each device provides the other functions to a lesser degree, as explained with reference to FIG. 2.

Looking at FIG. 4, the arrangement includes the use of burners 34' and dampers 38. As before, the flow of colder air from a primary source is effectively prevented and the quantity and velocity of air flowing out of chamber 22 are reduced by means of dampers 38.

Each burner 34' with its flame angularly directed toward the adjacent cooler 32 diverts some of the air which flows from the zone of the secondary source and across coolers 32 into the conventional low pressure zone at base 16 of sheet 10, so that it moves away from sheet 10. This produces a reduction in the quantity of air flowing in the direction of the draw of sheet 10. This air affected by burners 34' travels toward the location of the zone of a secondary source of air and is given a cyclic motion. Air is induced into this cyclic path from the sheet 10 along its length in the drawing chamber 22 thus decreasing the quantity of air in the envelope surrounding the sheet, the resultant envelope being that which has been referred to as the protective envelope. The end-around currents are diverted into the cyclic path created by burners 34' and will not affect the pattern of the sheet.

Thus, the invention utilizes in this embodiment a combination of catch pan dampers 38, primarily serving as barriers, and burners 34', primarily serving as diverters. Each device provides the other functions to a lesser degree, as explained with reference to FIG. 2.

In FIG. 5 there is an arrangement similar to that in FIG. 4 but with the addition of plates 36. The effect of dampers 38 and burners 34' are the same as explained with regard to FIG. 4. The plates 36 provide an auxiliary stack effect for currents of air which pass between plates 36 and adjacent coolers 32. The functions of plates 36 are the same as that explained with regard to the embodiment illustrated in FIG. 2 and require no repetition.

Therefore, the invention in the FIG. 5 embodiment utilizes a combination of catch pan dampers 38, primarily serving as barriers, burners 34', primarily serving as diverters, and plates 36, primarily serving as isolators. As before, each device provides the other functions to a lesser degree, as explained with reference to FIG. 2.

In FIG. 6, the arrangement includes burners 34'' and catch pan dampers 38'. Dampers 38' perform the same functions as dampers 38 in substantially eliminating the flow of colder air into chamber 22 and reducing both the quantity and velocity of air flowing out of chamber 22. Burners 34'' are placed directly in the normal path of movement of air in the zone of the secondary source, so as to reverse the direction of flow of air and create a cyclic path opposed to the normal one. Burners 34'' also create zones of low pressure so that air in the vicinity of coolers 32 moves into the cyclic path of movement of air within the zone of the secondary source rather than to base 16 of sheet 10. Thus, the quantity and velocity of air flowing to base 16 of sheet 10 is reduced. The air flowing toward base 16 of sheet 10 being materially reduced in velocity and in quantity the effects of its non-uniformity in velocities and temperatures are diminished, so that the relatively thin surface adhering film of air adjacent the sheet is not disturbed. Air still flows in the direction of the draw as a protective envelope because the flow of air to base 16 of sheet 10 is not entirely eliminated. Some of this air is diverted into the cyclic path of movement of the air in the zone of the secondary source and is rendered ineffective to disturb the film of air adjacent the sheet 10.

End-around currents are drawn into the cyclic path of movement of air in the zone of the secondary source and are thus rendered ineffective to disturb the relatively thin surface adhering film of air adjacent the sheet. Again, the overall effect is the material reduction or elimination in intensity of the usual wave patterns.

Thus, the invention utilizes in this embodiment a combination of catch pan dampers 38', primarily serving as barriers and secondarily serving as isolators, as explained with reference to FIG. 2; and burners 34'', primarily serving as barriers in that the velocity of air is changed from a plus value to a negative value and secondarily serving as diverters, in that direction of flow is changed.

In FIG. 7 there is an arrangement similar to that illustrated in FIG. 3 with the addition of baffle-burners 35 which include plates 37 along their length. Dampers 38 and burners 34 perform the same functions as explained with reference to FIGS. 2 and 3. Baffle-burners 35 because of their construction have a dual function. Baffles 37 are in the flow stream of air to base 16 of sheet 10 and reduce the velocity of this air. Being angularly disposed, baffles 37 divert air from base 16. The burner portions of baffle-burners 35 create zones of low pressure spaced from base 16 of sheet 10 and draw air from base 16 into this zone. The flames are in the path of air flowing to base 16 of sheet 10 and obstruct this flow, reducing its velocity. The flames divert air flowing into the created zones of low pressure and the obstructed air and cause the air to flow into the cyclic path of movement of air in the zone of the secondary source. End-around currents are also drawn into these created zones of low pressure and rendered ineffective. Some of the air still flowing in the direction of the draw is drawn into the cyclic path of movement in the zone of the secondary source and rendered ineffective to cause disturbance of the surface adhering film of air surrounding the sheet. Thus the quantity and velocity of air flowing along sheet 10 are materially reduced and the effects of the non-uniformity of air in velocity and temperature is diminished, so that disturbance of the relatively thin surface adhering film surrounding sheet 10 is eliminated or materially reduced, thereby lowering or eliminating the intensity of the usual wave patterns.

In this embodiment, catch pan dampers 38 primarily function as barriers and, secondarily, as explained with reference to FIG. 2, function as isolators; burners 34 primarily serve as diverters, and secondarily as barriers and isolators; and baffle-burners 35 have a dual function. The baffles 37 primarily serve as barriers in reducing the velocity of air flowing along sheet 10 and secondarily as diverters in changing the direction of flow. The burner portions function primarily as diverters in diverting flow from base 16 and coolers 32 away from sheet 10 and secondarily as barriers in changing the velocity of air flowing to base 16.

Experience has shown that each and every sheet glass drawing kiln differs somewhat in operation, probably due to minor differences in dimensions, location of cracks, crevices or the like, location relative to the glass melting tank, etc. Therefore, the exact placement and settings of burners, dampers, etc., to give a particular result requires merely individual adjustment and positioning for each drawing kiln. One manner in arriving at the correct adjustment and positioning is by observing the air currents within the chamber. This may be accomplished by placing a smoke producing agent at various locations in the chamber. This procedure also allows the observer to compare, generally, the relative velocities of the air currents.

The effectiveness of burners of this invention to alter and/or divert or reverse air currents in a drawing chamber depends upon location and type, direction and length of flame. The length of flame depends upon the amount and pressure of combustible supplied. The burners of this invention are placed in such a position as to create the desired principal currents of air in a drawing chamber in accordance with the invention described above. The burner must be positioned relative to the natural flow stream to the base of the sheet, so that the gases from the burner will divert or reverse this flow stream. The burner flames should cooperate with one another and be of such a character as to form a band of heated gas that is substantially the width of the sheet. The combustible supplied must be under sufficient pressure to provide a substantially unwavering directional flame.

By way of example, a burner has been constructed of a steel alloy pipe having an I.D. of 1 inch and a wall thickness of $1/16$ inch with openings drilled with a No. 51 drill (0.0670 inch in diameter) on $1/4$ to 1 inch centers. A mixture of combustible gas, such as natural gas, and heated air is fed by a pipe to the burner. Just outside of the drawing kiln, this pipe is furnished with the combustible gas and heated air from their sources by valved pipes. These valves are opened just sufficiently the get the desired flames. The gas source is at 4 to 6 p.s.i. gage and the heated air source is at 90 p.s.i. gage. The temperature of the heated air is approximately 100° F. and above.

Generally speaking, for optimum results, using the teachings of this invention, burners 34 shown in the FIGS. 2, 3 and 7 embodiments are placed on the lips of L-blocks 24 and have their flames directed from the vertical at an angle of approximately 45 degrees toward sheet 10. The flames are preferably 3 to 5 inches in length.

Each of burners 34' in the FIGS. 4 and 5 embodiments operate satisfactorily when located approximately midway between base 16 of sheet 10 and associated cooler 32, and preferably closer to sheet 10 than the cooler 32, with flames having a length of approximately 2 to 3 inches and directed from the vertical toward coolers 32 at an angle of approximately 45 degrees.

Burners 34'' in the FIG. 6 embodiment operate satisfactorily when located approximately midway the height of chamber 22 and between coolers 32 and L-blocks 24 with their flames directed substantially vertically or slightly angled from the vertical. Their position and length of flames for optimum results is determined by smoke tests and is therein indicated when the normal path of movement of air in the zone of the secondary source is reversed.

Baffle-burners 35 in the FIG. 7 embodiment are located between coolers 32 and sheet 10, closer to sheet 10 than to coolers 32, with flames of 2 to 3 inches in length angularly directed toward coolers 32. They are positioned a short distance from bath 12, preferably at the turn of the gather or base 16 with the terminal edges of the baffles 37 spaced ½ to ¾ inch from the glass.

Dampers 38 are preferably adjusted to a position where air flowing into chamber 22 from the drawing machine 20 is eliminated, but not to a position to prevent the flow of air with sheet 10 out of chamber 22. They have been positioned within ½ inch to ¾ inch of sheet 10. With construction as illustrated in FIG. 8, their terminal ends may be positioned to wipe against rolls 18.

Dampers 38′, while differing in construction from dampers 38, are positioned so as to be relatively close to sheet 10. In such a position they substantially eliminate the flow of air into chamber 22, but do not prevent the flow of air out of chamber 22. Care must be used in adjusting their position relative to sheet 10, so as to prevent damage to the sheet.

Plates 36, for optimum results in the FIGS. 2 and 5 embodiments, are adjusted to define an angle preferably of between 130 degrees and 135 degrees with coolers 32. Their leading edges have been spaced ½ inch to ¾ inch from sheet 10, and their trailing edges have been spaced 2 inches to 3 inches from coolers 32. A preferred ratio of the space between the trailing edge and cooler and the space between the leading edge and glass sheet is from 5:1 to 10:1.

Satisfactory operation has been accomplished with plates 36 inclined downwardly toward sheet 10 to define an angle of between 40 and 45 degrees with coolers 32. The spacings between plates 36 and sheet 10 or coolers 32 are specified above.

It has been stated above that the appearance of a glass sheet is improved by the use of the present invention. This improvement has been demonstrated by the use of a test. In this test a white screen is placed 25 feet from the light source comprising a 1000-watt bulb in an apertured box. A random selected substantially full width sample of glass sheet is cut into 5 equal parts across its width and each sample part is placed between the box and the screen with the direction of draw of the sheet being horizontal. Each sample part is first tilted to determine the area having the most pronounced wave pattern. The same is then placed parallel to the screen and moved slowly toward the screen while providing a slight up and down motion until the most pronounced wave shadow disappears. The distance from the screen to the sample part at this point of disappearance measured in inches is referred to as the disappearance reading. Thus disappearance readings are taken of the glass sheet at spaced intervals across its width.

The following tabulation sets forth the disappearance readings of samples of glass made using the kiln arrangement of FIG. 1 and using kiln arrangements including various combinations of the devices of this invention. The average reading is an average of five readings and the high and low readings are the high and low readings, respectively, of five readings. High disappearance readings, such as 30 inches and above, not before obtained in the manufacture of sheet glass, are indicative of glass of much improved appearance. However, because of the character of the described test, the resolution for such high readings is less precise than for lower readings. Therefore, readings of between 30 and 40 inches are given as 30+, and readings of over 40 inches are given as 40+.

Each arrangement listed below includes coolers 32. When the arrangement is the same as shown in the drawings, it will be further identified by the particular figure number.

| Arrangement | Disappearance Readings in Inches | | |
|---|---|---|---|
| | Average | High | Low |
| 1. Prior Art (Fig. 1) | 7.6 | 9 | 7 |
| 2. Burners 34, Plates 36, Dampers 38 (Fig. 2) | 30+ | 40+ | 30+ |
| 3. Burners 34, Dampers 38 (Fig. 3) | 17.2 | 19 | 15 |
| 4. Burners 34′, Dampers 38 (Fig. 4) | 18.2 | 22 | 15 |
| 5. Burners 34′, Plates 36, Dampers 38 (Fig. 5) | 17.8 | 27 | 14 |
| 6. Burners 34″, Dampers 38′ (Fig. 6) | 14.2 | 15 | 13 |
| 7. Burners 34, Baffle-Burners 35, Dampers 38 (Fig. 7) | 23.8 | 28 | 19 |
| 8. Same as arrangement 2, (Fig. 2) except without plates 36 and dampers 38 | 17.4 | 19 | 15 |
| 9. Same as arrangement 2, (Fig. 2) except without burners 34 and dampers 38; and plates 36: | | | |
| (a) angled 40° down toward base 16 | 10.8 | 12 | 10 |
| (b) angled 30° down toward base 16 | 13.6 | 16 | 11 |
| 10. Same as arrangement 2, (Fig. 2) except without burners 34 and plates 36 | 10.4 | 13 | 9 |
| 11. Same as arrangement 2, (Fig. 2) except without dampers 38; and plates 36 angled 30° down toward base 16 | 14.8 | 19 | 10 |
| 12. Same as arrangement 2, (Fig. 2) except without burners 34; and plates 36 angled 40° down toward base 16 | 10.8 | 12 | 10 |
| 13. Same as arrangement 6, (Fig. 6) except without burners 34″ | 8.6 | 11 | 7 |
| 14. Same as arrangement 6, (Fig. 6) but with the addition of plates 36 angled 40° down toward base 16 | 22.8 | 28 | 16 |
| 15. Same as arrangement 7, (Fig. 7) except without burners 34 | 18.6 | 20 | 17 |

The foregoing descriptions of embodiments have been presented for purpose of illustration only. Many modifications will be apparent to one skilled in the art. For example, for known drawing kilns of other construction, the devices described above can be suitably positioned and operated to provide the desired principal air currents in accordance with the invention, and thereby improve the appearance of the glass sheet.

We claim:
1. A process of drawing sheet glass upwardly from a molten bath through a cooled drawing chamber located above said bath,
   said drawing chamber being provided with coolers in a lower region thereof disposed above the bath on opposed side surfaces of the sheet, which coolers extend in the direction of the draw of the sheet and
   wherein said sheet of glass is withdrawn through an opening in the drawing chamber through which gas enters the chamber and flows toward cool regions therein
   and gas flows longitudinally along the side surfaces of said sheet in the direction of the draw to leave said chamber through said opening therein and wherein
   ambient gas currents containing said gas entering said chamber through said opening exist in the drawing chamber
   which currents produce wave in the drawn sheet,
   the improvement which comprises;
   forming a stream of hot gas on each side of the sheet in a lower region of said chamber at a location above the molten bath and spaced from each side surface of said sheet,
   establishing a velocity of each said hot gas streams sufficient to carry said gas into an upper region of said chamber and directing said streams upwardly in a direction which is offset horizontally away from said sheet with respect to the edges of said opening while permitting flow of gas longitudinally along the sides of said sheet in the direction of the draw through said chamber, and the opening therein, past said gas entering said chamber, and
   establishing a path of flow of each said hot gas streams in a direction extending toward a location in the uppermost region of said chamber where said gas enters said opening which flow diverts the ambient gas currents to regions remote and laterally spaced from the sides of said sheet whereby the wave in said sheet is materially reduced.

2. A process according to claim 1 wherein said sheet is drawn from the surface of said bath and burning a combustible to form said gas streams.

3. A process according to claim 2 wherein said drawing chamber is defined by spaced refractory L-blocks, and burning said combustible in a central area of said chamber at locations closely adjacent and above a horizontal portion of said L-blocks and spaced from a vertical portion thereof.

4. A process of drawing sheet glass upwardly from a molten bath through a cooled drawing chamber located above said bath,
   said drawing chamber being provided with coolers in a lower region thereof disposed above the bath on opposed side surfaces of the sheet, which coolers extend in the direction of the draw of the sheet and
   wherein said sheet of glass is withdrawn through an opening in the drawing chamber defined by edges and through which gas enters the chamber and flows toward cool regions therein
   and gas flows longitudinally along the side surfaces of said sheet in the direction of the draw to leave said chamber through said opening therein and wherein
   ambient gas currents containing said gas entering said chamber through said opening exist in the drawing chamber which currents produce wave in the drawn sheet,
   the improvement which comprises;
   forming a stream of hot gas on each side of the sheet in a lower region of said chamber at a location above the molten bath and spaced from each side surface of said sheet;
   directing said streams upwardly in a direction which is offset horizontally away from said sheet with respect to the edges of said opening,
   and maintaining the direction of said streams while establishing and maintaining the velocity thereof sufficiently low to permit flow of gas longitudinally along the sides of the sheet in the direction of the draw as the sheet passes through the chamber and sufficiently high to divert ambient gas in said chamber and thereby materially reduce wave in the sheet.

References Cited in the file of this patent

UNITED STATES PATENTS

| | | |
|---|---|---|
| 1,865,811 | Amsler | July 5, 1932 |
| 2,158,669 | Amsler | May 16, 1939 |
| 2,201,286 | Bundy | May 21, 1940 |
| 2,352,539 | Halbach et al. | June 27, 1944 |
| 2,693,052 | Brichard | Nov. 2, 1954 |

FOREIGN PATENTS

| | | |
|---|---|---|
| 525,898 | Great Britain | Sept. 6, 1940 |
| 768,741 | Great Britain | Feb. 27, 1957 |

UNITED STATES PATENT OFFICE
CERTIFICATE OF CORRECTION

Patent No. 3,097,942                          July 16, 1963

Robert A. James et al.

It is hereby certified that error appears in the above numbered patent requiring correction and that the said Letters Patent should read as corrected below.

Column 1, line 36, for "crevises" read -- crevices --; column 7, line 52, for "of", first occurrence, read -- or --; column 10, line 49, for "the", first occurrence, read -- to --.

Signed and sealed this 26th day of January 1965.

(SEAL)
Attest:

ERNEST W. SWIDER
Attesting Officer

EDWARD J. BRENNER
Commissioner of Patents